United States Patent
Scharmann et al.

(10) Patent No.: US 9,355,063 B2
(45) Date of Patent: May 31, 2016

(54) PARKING LOT DETECTION USING PROBE DATA

(75) Inventors: Hannes Scharmann, Hildesheim (DE); Heiko Mund, Hildesheim (DE); Oleg Schmelzle, Laatzen (DE); Hans-Ulrich Otto, Hildesheim (DE)

(73) Assignee: TomTom Germany GmbH & Co. KG, Harsum (DE)

( * ) Notice: Subject to any disclaimer, the term of this patent is extended or adjusted under 35 U.S.C. 154(b) by 113 days.

(21) Appl. No.: 13/816,492

(22) PCT Filed: Aug. 12, 2010

(86) PCT No.: PCT/EP2010/004975
§ 371 (c)(1),
(2), (4) Date: Apr. 22, 2013

(87) PCT Pub. No.: WO2012/019628
PCT Pub. Date: Feb. 16, 2012

(65) Prior Publication Data
US 2013/0211699 A1   Aug. 15, 2013

(51) Int. Cl.
| | | |
|---|---|---|
| G01C 21/32 | (2006.01) | |
| G06F 17/00 | (2006.01) | |
| G01C 21/36 | (2006.01) | |
| G08G 1/01 | (2006.01) | |
| G08G 1/14 | (2006.01) | |

(52) U.S. Cl.
CPC ............... *G06F 17/00* (2013.01); *G01C 21/32* (2013.01); *G01C 21/3685* (2013.01); *G08G 1/0112* (2013.01); *G08G 1/0129* (2013.01);
(Continued)

(58) Field of Classification Search
CPC ....... G08G 1/00; G08G 1/0141; G08G 1/166; G08G 1/096811; G08G 1/096827; G08G 5/065; G01C 21/00; G01C 21/26; G01C 21/34; G01C 21/3635; G01C 21/3694; G01C 23/00; B62D 15/028; G05D 2201/0213; G05D 1/0257; G05D 1/027; G05D 1/0274; G05D 1/0278
See application file for complete search history.

(56) References Cited

U.S. PATENT DOCUMENTS

| | | |
|---|---|---|
| 6,640,188 B2 | 10/2003 | Hashida |
| 7,940,194 B2 | 5/2011 | Goto et al. |

(Continued)

FOREIGN PATENT DOCUMENTS

| | | |
|---|---|---|
| EP | 1256784 A2 | 11/2002 |
| JP | 2000310542 A | 11/2000 |

(Continued)

OTHER PUBLICATIONS

International Search Report issued May 30, 2011 for International Application No. PCT/EP2010/004975.

*Primary Examiner* — James Trammell
*Assistant Examiner* — Demetra Smith-Stewart

(57) ABSTRACT

Parking lot (18, 20) locations and geometries are discerned from probe data (22) and integrated with a digital map (12) for use in navigation and other map-related activities. The steps of this invention include: identifying the positions in the probe data (22) where cars are probably parked, detecting the positions of parking lots (18, 20), determining the extension and shape of the detected parking lots (18, 20), and adjusting the parking lots (18, 20) into the road network (14). Optionally, the parking lot (18, 20) can be classified and additional attributes computed. Finally, a topological connection of the parking lot (18, 20) is made to the road network (14) during which entrances (34) and exits (36) are identified.

16 Claims, 8 Drawing Sheets

(52) U.S. Cl.
CPC ............. *G08G1/0141* (2013.01); *G08G 1/143* (2013.01); *G08G 1/146* (2013.01)

(56) References Cited

U.S. PATENT DOCUMENTS

| | | | |
|---|---|---|---|
| 7,948,399 B2 * | 5/2011 | Tomita et al. | 340/932.2 |
| 2002/0169552 A1 | 11/2002 | Hashida | |
| 2008/0228394 A1 * | 9/2008 | Fukuda et al. | 701/208 |
| 2009/0138497 A1 * | 5/2009 | Zavoli et al. | 707/102 |
| 2009/0153362 A1 | 6/2009 | Goto et al. | |
| 2013/0030690 A1 * | 1/2013 | Witmer | 701/409 |
| 2014/0040179 A1 * | 2/2014 | Herzog et al. | 706/52 |

FOREIGN PATENT DOCUMENTS

| | | |
|---|---|---|
| JP | 2004251790 A | 9/2004 |
| JP | 2008164831 A | 7/2008 |

\* cited by examiner

PARKING LOT DETECTION USING PROBE DATA

Cross-References to Related Applications

This application is the National Stage of International Application No. PCT/EP2010/004975, filed Aug. 12, 2010 and designating the United States. The entire content of this application is incorporated herein by reference.

BACKGROUND OF THE INVENTION

1. Field of the Invention

This invention relates to digital maps of the type for displaying road information, and more particularly toward a method for updating information contained in a digital map using probe data.

2. Related Art

Personal navigation devices like that shown for example at 10 in FIG. 1 utilize digital maps combined with accurate positioning data from GPS or other data streams. These devices have been developed for many applications, including navigation assistance for automobile drivers and delivery services. The effectiveness of any navigation system is inherently dependent upon the accuracy of the information provided to it in the form of digital maps, stored in its memory or otherwise accessed through a suitable database connection such as wireless signal, cable, telephone line, etc.

Typically, a navigation system 10 includes a display screen 12 that portrays a portion of a stored digital map as a network of roads 14. A navigation system 10 can be a dedicated portable device like shown in FIG. 1, a personal computer, cellular phone, smart phone, personal digital assistant, or other device. The navigation system 10 may or may not be GPS-enabled. A traveler having access to a GPS-enabled navigation device 10 may then be generally located on the digital map close to or with regard to a particular road 14 or segment thereof.

Some GPS-enabled navigation devices 10, like several models manufactured by TomTom NV (www.tomtom.com), may also be configured as probes to passively generate probe measurement points at regular intervals. Such probe measurements from a single device are strung together as traces, which comprise a sequence of discrete geo-coded positions recorded at intervals of, for example, five seconds. A single trace represents a journey of a single vehicle from or near a starting point to a destination point. Of course, other suitable devices may be used to generate probe measurement points including, for example, handheld devices, mobile phones, PDAs, and the like. Thus, probe data may be described as a set of information about the movements of a vehicle (or a person carrying a probe) which contains time-stamped geographic locations (xyz coordinates) and possibly also metadata (vehicle speed, receiver type, vehicle type, etc.).

It is known to take collections of probe measurements from multiple traces and vehicles for the purpose of incrementally creating and/or updating digital maps. The probe measurements can be transmitted either on-the-fly or subsequently to a collection service or other map data analysis service via wireless (e.g., cellular) transmission, via Internet uploads, or by other convenient methods. Internet uploads may be synchronized to occur in conjunction with digital map upgrades which navigation device users might obtain as part of a service. From the collection of probe measurements, road geometries can be inferred and other features and attributes derived by appropriate analytical methods.

Digital maps are frequently composed as a mosaic of geo-coded image tiles which, when arranged side by side, create a bird's eye mosaic (BEM) of a particular surface of interest, such as a section of land on the earth. An exemplary tile is generally indicated at 16 in FIG. 2 and may represent either a non-rectified or an orthorectified area of land. The particular size or scale of a tile 16 can vary from one digital map to the next, but as shown in FIG. 2, frequently comprises an area sufficient to contain a modest number of roads 14 and road segments. Thus, the tile 16 shown in FIG. 2 would be merely one of many tiles stitched together to make up a digital map of the type contained in a digital map database.

Probe traces collected over time can be grouped according to those which match to a common tile 16 and then overlaid for interpretation by database editors. Editors use various mathematic and statistical techniques to determine or infer road geometries, compute speed profiles, acceleration profiles, direction of travel, altitude, detect changes in road networks, to compare two road networks, and the like. A typical collection of probe measurements collected from a plurality of probes traversing a particular tile section over an extended period of time may contain billions of discrete data points, each time stamped. See, for example, FIG. 3 which represents the tile 16 of FIG. 2 overlaid with exemplary probe data. Each probe trace comprises a sequence of data points generated by a single device, typically carried in a motor vehicle as it travels over the road network in real life. As mentioned above, the data points generated by the complete start to stop journey of a single vehicle can be referred to as a "trip."

As suggested previously, the effectiveness of a personal navigation device 10 depends upon the accuracy of the information contained in the digital map. Digital map providers continuously strive to improve and update their maps. Inaccurate or incomplete data, for example, may be unsuitable to compute optimal routes in response to a navigation query, or to otherwise provide unreliable information to a traveler. Frequently, navigation decisions will take into account suitable parking accommodations for a motor vehicle. For example, in dense, urban areas, parking lots or car parks may be rather scarce and difficult to find. The precise location of car parks is an important detail to be recorded in a digital map, however these features have been largely determined using historic information which may not reflect a present reality. Furthermore, the location and size of car parks frequently changes in response to periodic construction and maintenance activities, and therefore the need to provide up-to-date information regarding the location of parking lots is highly relevant.

Until now, there is no effective method by which to analyze probe measurements to determine the location, size, classification or other relevant details of a parking lot. In part, privacy concerns about the movement of vehicles that produce probe traces have resulted in a custom whereby the beginning and end of each probe trace is truncated. Unfortunately, these beginning and/or end points are most pertinent relative to car parking locations. Therefore, there is a need in the art for an improved method for effectively analyzing probe data that may have been truncated for privacy reasons to validate and/or determine specifications for car parking facilities relative to a road network in a digital map.

SUMMARY OF THE INVENTION

This invention relates to methods and techniques for detecting parking lots from collected probe data for use in digital maps. The method of this invention includes a digital map containing a road network of the type corresponding to roads in reality that support vehicular traffic. Probe data is provided comprising a plurality of individual probe traces. Each probe trace represents the movements of a real life vehicle over the road network. Probe trace candidates are identified from within the probe data that correspond to at least one predetermined pattern indicative of parking lot behavior. At least one distinct parking lot is discerned from the probe trace candidates. The spatial extent of the parking lot is determined directly from the probe trace candidates.

The principles of this invention can be used effectively to locate car parking locations where none currently exist within a digital map. Likewise, digital map errors can be identified, namely if a parking lot is shown in the digital map but in reality does not exist. Accordingly, this invention enables a new use for information obtained from community input or other probe measurement collection techniques.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Referring to the figures wherein like numerals indicate like or corresponding parts throughout the several views, this invention pertains to digital maps as used by navigation systems, as well as other map applications which may include those viewable through internet enabled computers, personal digital assistants (PDAs), smart phones, cellular phones, and the like.

Figure 1:
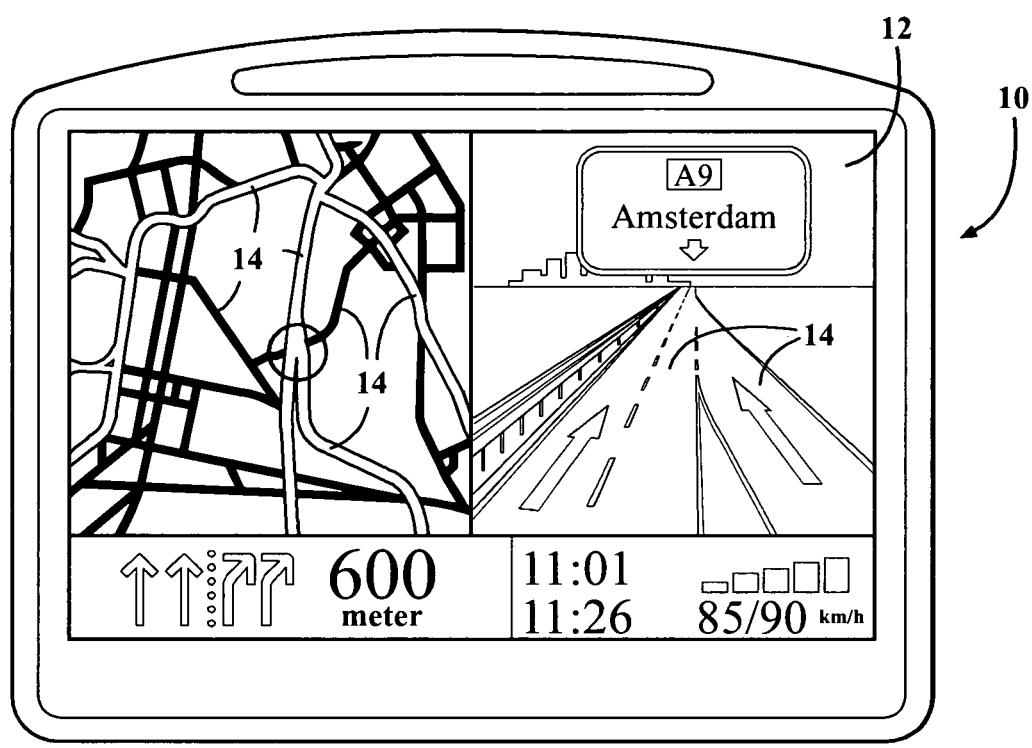
FIG. 1 is an exemplary view of a portable navigation device according to one embodiment of this invention including a display screen for presenting map data information.
Figure 2:
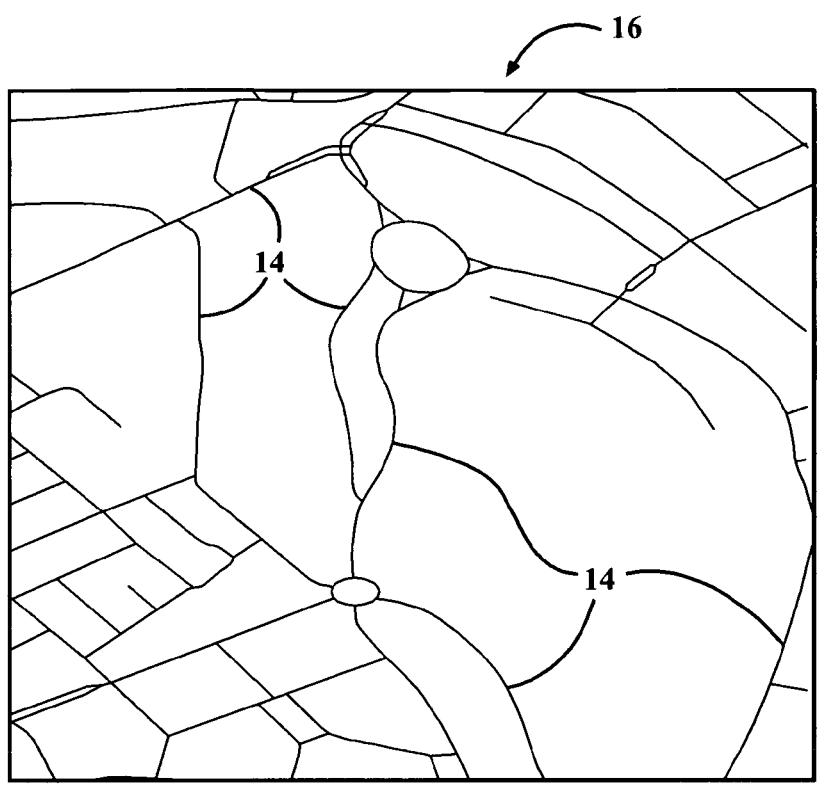
FIG. 2 is an exemplary view of a tile as may form part of a digital map of the type contained in databases and used for navigation purposes.
Figure 3:
FIG. 3 is a view of the tile as shown in FIG. 2 and superimposed with raw probe measurements in the form of discrete, time-stamped probe positions collected from a plurality of probe traces within the tile over some defined time period.
Figure 4:
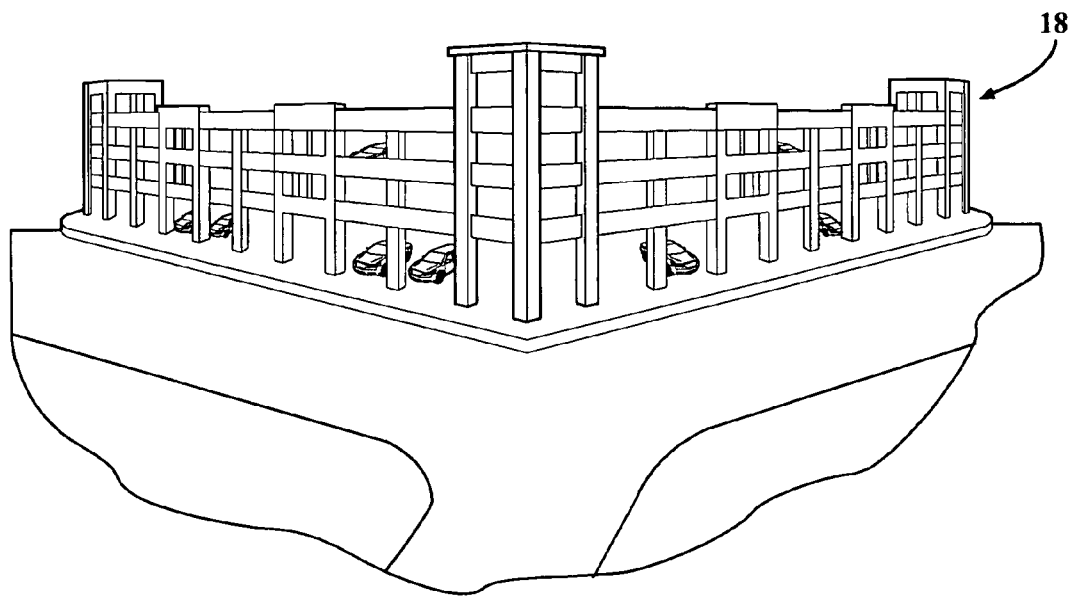
FIG. 4 is an exemplary view of a multi-level car parking structure.
Figure 5:
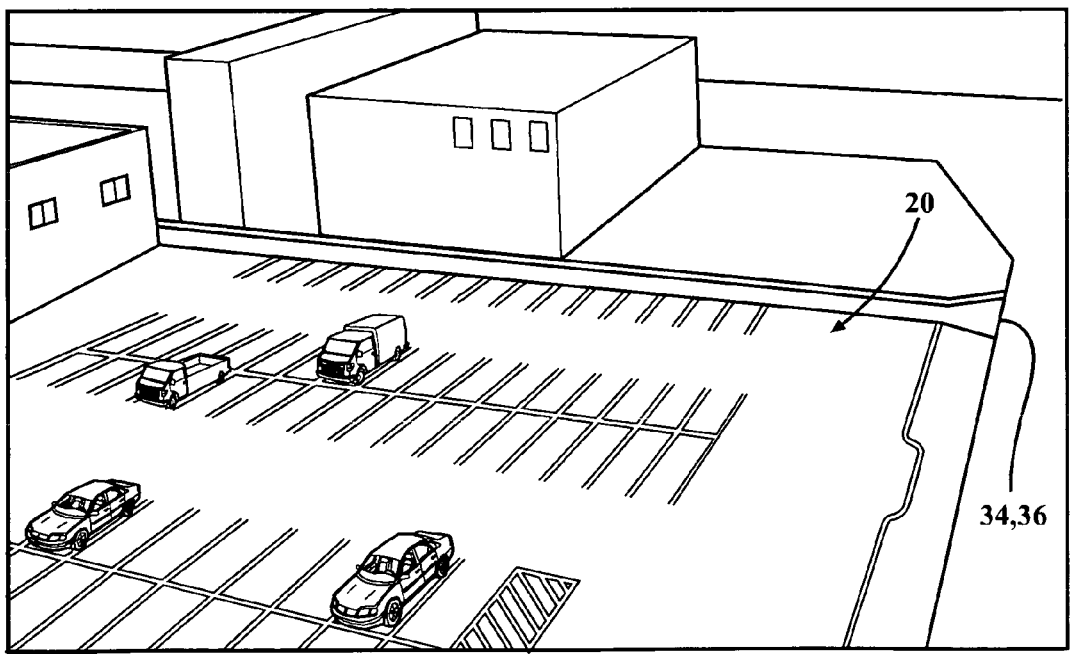
FIG. 5 is an exemplary view of a surface-type parking lot.

This invention establishes an automatic process useful to detect parking lots, car parks, roadside parking spaces, and other areas where automobiles are routinely parked. The detection of parking lots has been considered exceptionally challenging until now due to several perceived difficulties. Firstly, one has to find a location where there is a high probability of a parking lot. For that purpose, one must identify positions, i.e., specific data points, in the probe data which probably are related to a parking lot. Because a parking lot often has a large extension, it is preferably modeled in a digital map as an area feature. Therefore, it is necessary to detect the extension and shape of the detected parking lot as well. In order to integrate the detected parking lot into a digital map, it is also advantageous to connect the parking lot with the surrounding or adjacent road network from which access to the parking lot is gained. Additional usefulness from the digital map can be gained by distinguishing between the different kinds of parking lots. For example, a multi-level parking structure 18 is shown in FIG. 4, whereas a smaller surface lot type parking area 20 is shown in FIG. 5. Further useful information may include whether a parking lot 18, 20 is restricted to short-term use or long-term use. Whether cars are permitted to park along the street or if the parking area is a petrol station would be other useful pieces of information to be recorded in digital maps. Moreover, computing attributes associated with the parking lot 18, 20 may be helpful to motorists such as, for example, the mean parking duration, size, cost, or frequency of use.

The general concepts of this invention include the steps of: 1) identifying positions in the probe data where probably cars are parked; 2) detecting the positions of the parking lots; 3) determining the extension and shape of detected parking lots; 4) adjusting the parking lot into the road network; 5) classifying the detected parking lots; 6) computing additional attributes of the detected parking lots; and 7) determining the topological connection to the road network.

In order to detect the location of a parking lot, first it is beneficial to find out the locations where several vehicles have been parked. As described previously, this is often difficult because at the beginning and end of each probe trace sequence there may be a lack of GPS data which has been previously removed for data privacy protection reasons. Naturally, these beginning and end parts of the trace sequences are most interesting for the detection of parking lots. To detect nevertheless positions where cars are parked, patterns have been created in the context of this invention with which to evaluate the trace data. Once the positions of a parking lot have been identified with a sufficient level of probability, probe traces are clustered in order to identify those which belong probably to the same parking lot. Different clustering methods can be used for this purpose including for example density-based or grid-based clustering algorithms, as described in greater detail below.

Figure 6:
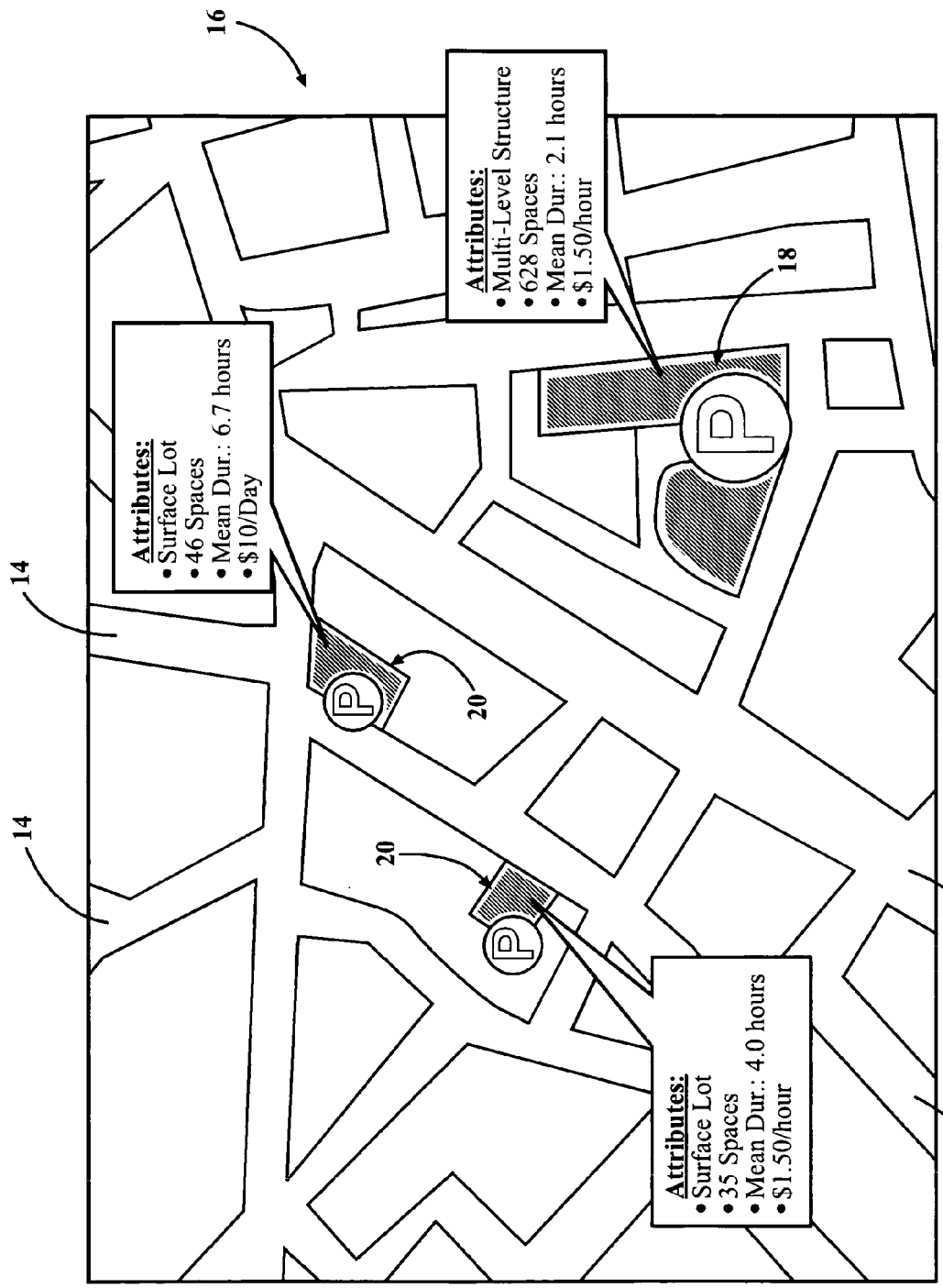
FIG. 6 is an exemplary section of a digital map indicating three distinct parking lots in an urban area, including attributes derived using the methods of this invention.

FIG. 6 shows an exemplary section of a digital map 16 containing several parking areas 18, 20 identified using techniques described herein, and wherein additional attributes have been determined and associated with each parking lot 18, 20 so as to provide more detailed and useful information to drivers.

Figure 7:
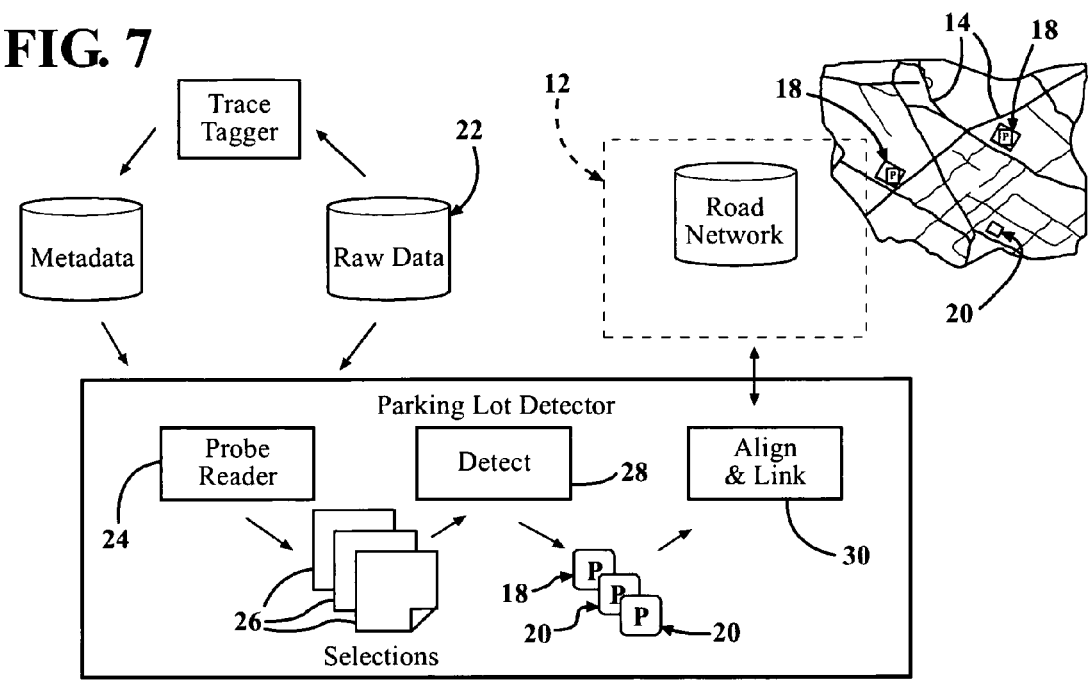
FIG. 7 is an exemplary logic diagram for one possible implementation of this concept.

Referring now to FIG. 7, an exemplary flow diagram is provided to illustrate the architecture of one possible implementation of this concept. Raw probe data 22 is provided by any suitable means including the use of historic data and/or the collection of live data. The probe data 22 includes a plurality of individual probe traces, each comprised of sequential probe data positions and representing a trip or journey for a particular motor vehicle over the road network 14. The probe data 22 is pre-analyzed and then fed to a probe data reader 24 which compares the individual probe traces to one or more patterns that have been defined and associated with certainty factors. A part of a trace matching any of the patterns with the sufficient probability is deemed a probe trace candidate 26. In other words, the candidates 26 are identified from among the probe data 22 as being those which contain probe data points or positions that correspond to at least one predetermined pattern indicative of parking lot behavior. Numerous patterns can be used either individually or in combinations. Several examples of patterns are defined below, with the understanding that alternative pattern logics may be implemented without departing from the spirit of this invention.

According to one fairly straightforward pattern, a stop sequence is established as a set of consecutive positions with an approximate equal or identical spatial location. Any part of a probe trace which fulfills the stop sequence criterion and in addition exceeds a specific duration measured in seconds (although the specific measurement units are not relevant) should be considered as a potential candidate. Thus, a threshold $T_s$ can be established that represents the duration to be used in this simple stop-sequence-based pattern.

According to another approach, accumulation points can be used in connection with a stop-sequence-based pattern. In this approach, an accumulation filter for an import tool utilized within the probe data reader 24 accumulates consecutive trace points which are close together. This technique can be accomplished using principles known to those of skill in the art. In addition, the accumulation filter can be used to classify the accumulated points into one of several types. Parking positions of cars may then be marked with the appropriate type, e.g., AP-type "isolated." These positions should have a high weight. Possibly, they are in a separate sequence. It is also possible to use the accumulation filter without the import tool and with adjusted parameters.

Alternatively, probe trace candidates can be identified using log-event-based patterns. As is well known, probe traces can be recorded with a personal navigation device 10 having multiple distinct modes. These may include, for example, a SUSPEND mode (wherein the device has been suspended), a RESUME mode (wherein the device has been resumed), a RESET mode (wherein the device has been started), a NAVIGATE mode (wherein a navigation target has been set), and a REPLAN mode (wherein route replanning has occurred). According to one log-event-based pattern technique, a power cycle pattern may be observed for the purpose of identifying probe trace candidates 26 contained within the probe data 22. According to a power-cycle pattern, it can be assumed that a user switches OFF their personal navigation device 10 for parking, and then powers the device 10 ON again when resuming the journey. In this instance, the recorded trace data 22 should contain two consecutive sequences reflecting this situation. The second sequence will be flagged with a "RESUME" event. To determine whether this situation indicates a parking situation, the elapsed time $T_p$ and traveled distance $D_p$ must be taken between these two sequences. Defining thresholds for both time and distance will sufficiently accommodate the data truncation which is sometimes done for end-user privacy reasons as described above. For example, the first 90 seconds of any sequence associated with a RESUME or RESET event may be truncated by the data center so as to preserve the end user privacy in terms of residence locations, places visited, etc.

A still further log-event-based pattern which may be implemented for the purpose of identifying probe trace candidates 26 contained within the probe data 22 is referred to as a GPS-fix pattern. According to this technique, it is assumed that a user has parked their vehicle and begins a new journey by entering new destination information into the navigation device 10. In this situation, a new sequence will start, associated with a "NAVIGATE" mode event. If the strength of the GPS signal is not sufficient enough to calculate the route, the device 10 will still keep recording, but in most cases trigger a "REPLAN" event by the time the device has finished the route calculation. This may result in a sequence with a small or even no spatial extent. Classifying these sequences as candidates 26 on the basis of these constraints and in combination with a threshold concerning the spatial extent (e.g., the diagonal length of the bounding box surrounding the sequence) can in some or all cases be sufficient to achieve the desired outcome.

Once the probe trace candidates 26 have been identified, it is necessary to discern from them at least one distinct parking lot 18, 20. This discerning step is indicated at 28 in FIG. 7, and includes finding all of the data positions where, with a certain possibility, the several cars represented within the candidate traces 26 have been parked. From this, a technique is employed to determine which of the positions identified as parking locations belong probably to the same distinct parking lot 18, 20. One can use different clustering methods for this purpose. Ideally, the clustering method employed should be able to find clusters with different sizes and different shapes. The clustering algorithm should also be able to detect the number of clusters by itself. Most suitably, a density-based or grid-based clustering algorithm is used. These are explained in, for example, Ester, et al.: A Density-Based Algorithm for Discovering Clusters in Large Spatial Databases with Noise. Proc. 2nd Int. Conf. on Knowledge Discovery and Data Mining, Portland, Oreg., AAAI Press, 1996, 226-231 and Ankerst, et al.: OPTICS: Ordering Points To Identify the Clustering Structure. Proc. ACM SIGMOD, Philadelphia, Pa., 1999, 49-60. However, for large data sets, density-based clustering algorithms are typically very slow. See for example, Böhm et al.: Immer gröBere and komplexere Datenmengen: Herausforderungen für Clustering-Algorithmen. Datenbank-Spektrum, 9:11-17, 2004. In order to accelerate the clustering step, it may be advisable to use a grid-based clustering algorithm with a Z-order-based spatial indexing, as will be known to those of skill in the art.

Referring again to FIG. 7, function block 30 represents the steps of determining a spatial extent of the parking lot 18, 20 and connecting the parking lot 18, 20 to the road network 14. Based on experimental results, it has been found difficult to detect the exact shape of a parking lot 18, 20 because the density of the found probably parking positions of the several cars is not very great. Therefore, a simplified model has been developed according to the techniques of this invention. The simplified model recognizes that most parking lots 20 have a rectangular shape. In this simplified model, each parking lot 18, 20 is initially represented as rectangle 32 with an arbitrary orientation. In order to determine the orientation and the size of the rectangle 32, a Principal Component Analysis (PCA) can be used. PCA is an orthogonal linear transformation that transforms the data to a new coordinate system such that the greatest variance by any projection of the data comes to lie on the first coordinate. This is referred to as the first principal component. The first principal component determines the longer side of the rectangle 32. For each cluster, a covariance matrix is computed. Because the geographical coordinate system is not a Cartesian coordinate system, at first it is preferred to transform the points of the cluster to a local Cartesian coordinate system. Then, the covariance matrix can be computed. After that, both eigenvalues $\lambda 1$, $\lambda 2$ and eigenvectors C1, C2. The eigenvector C1 which belongs to the greater eigenvalue $\lambda 1$ determines the first principal component. The eigenvalue $\lambda 1$ is the variance in the direction of the first principal component. To determine the length of the rectangle 32 and the direction of the eigenvector C1, the square root of the eigenvalue $\lambda 1$ is computed and multiplied by a constant factor k. Preferably, a constant factor k greater than 0 is used, and more preferably still between 1 and 2. Most preferably, a constant factor of k=1.5 can be used to deliver acceptable results.

Figure 8:
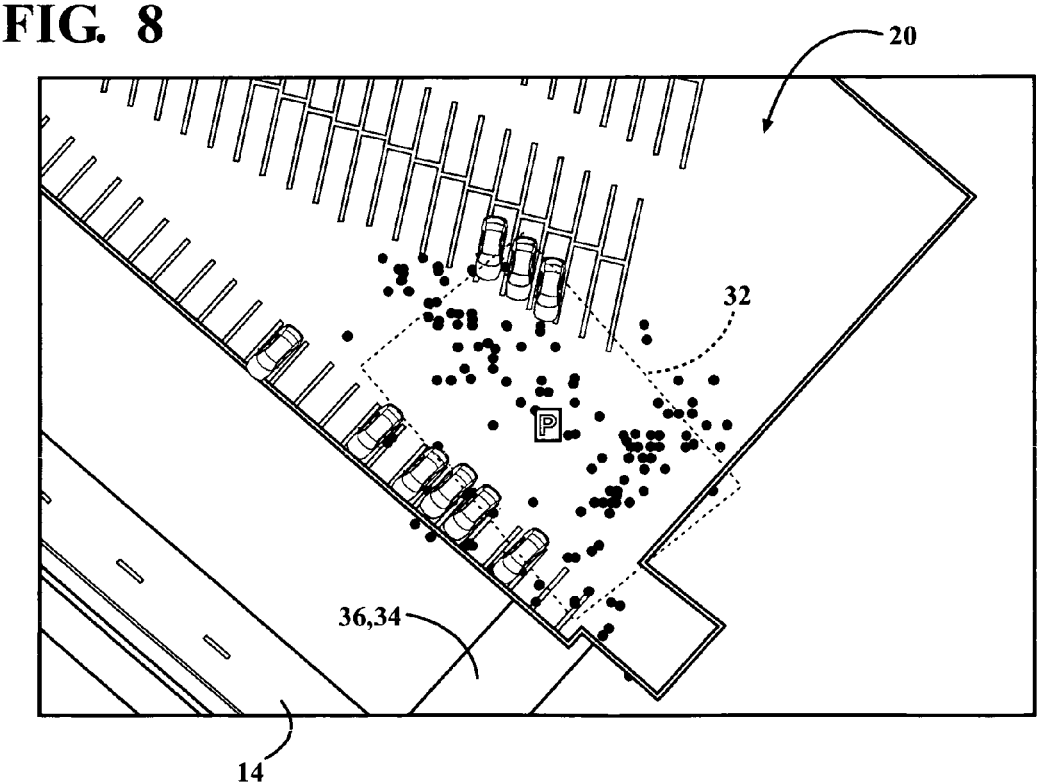
FIG. 8 is an example of a parking lot wherein probe measurements from trace data indicate the positions where motor vehicles have been parked, together with a broken rectangle approximating the size and shape of the parking lot determined using a Principal Component Analysis technique according to one embodiment of this invention.

The other eigenvector C2 is orthogonal to C1 and determines the smaller edge of the rectangle 32. The length of the small edge of the rectangle 32 is computed with the square root of the smaller eigenvalue $\lambda 2$ and multiplied then by the constant factor k. Although the determined size and shape of the parking lot 18, 20 in many cases will be indicated with extremely accurate results, the size as well as the orientation of the rectangle 32 may not always be correct. For example, as shown in FIG. 8, a large parking lot 20 which is only infrequently used may indicate a disproportionate sized lot 20. Therefore, it is preferable to adjust the shape of the parking lot relative to an adjacent road network 14 and/or other corroborating data such as aerial photographs, ground truth, etc. While the road network 14 can be generated from the same probe data 22, it is also possible to use any other external road map for these purposes.

Figure 9A:
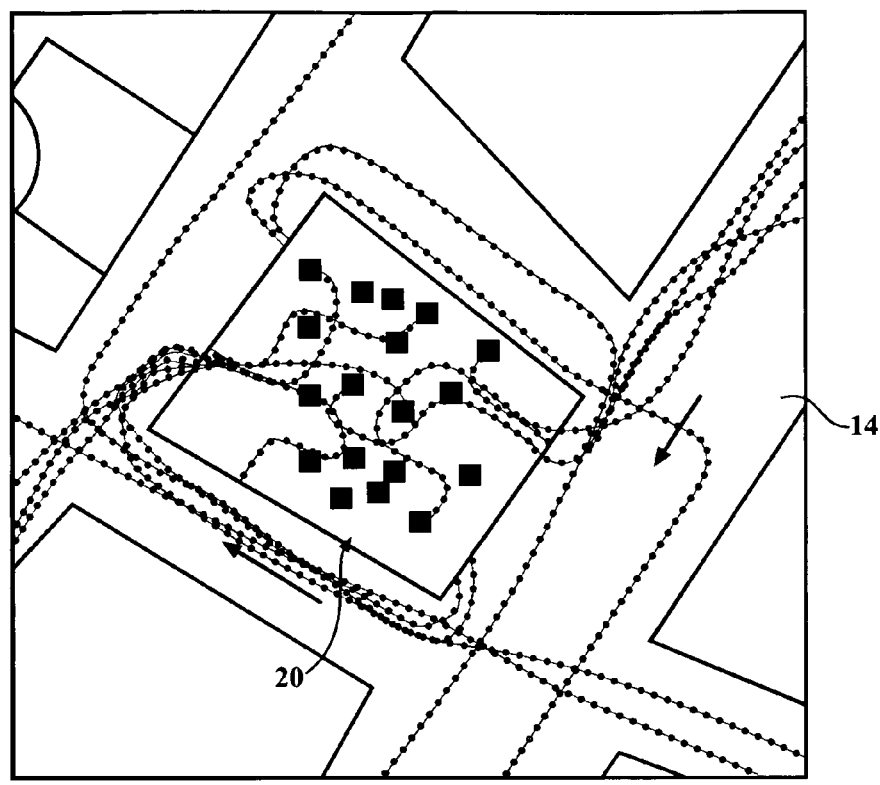
FIG. 9A is an exemplary section of a digital map overlaid with probe trace candidates gleaned from probe data.
Figure 9B:
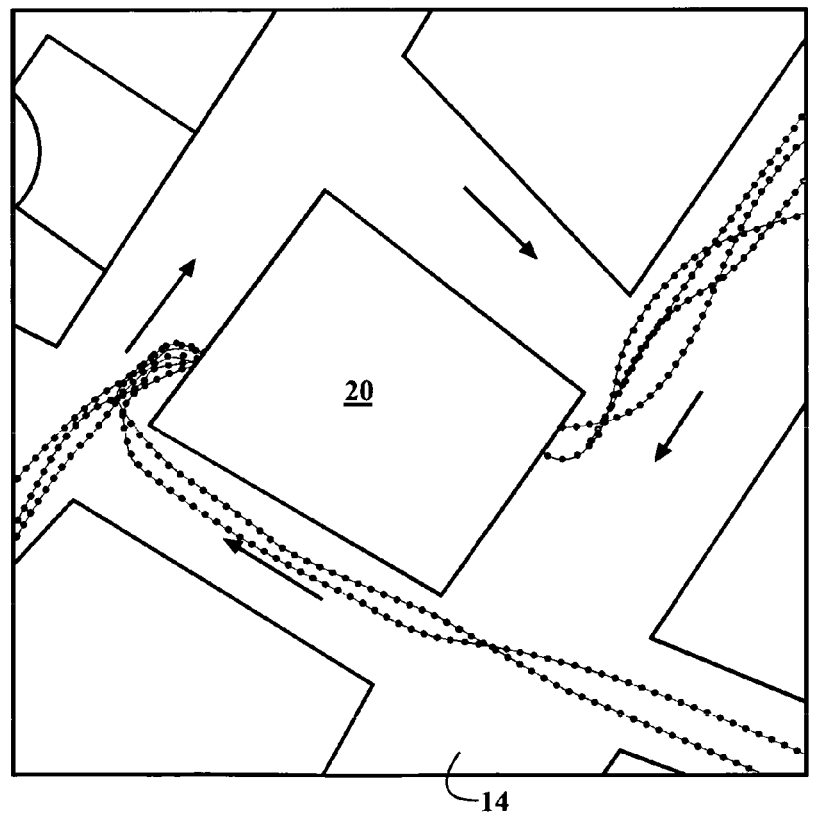
FIG. 9B is a view as in FIG. 9A showing only that part of the probe traces existing in time before entering the parking lot area.
Figure 9C:
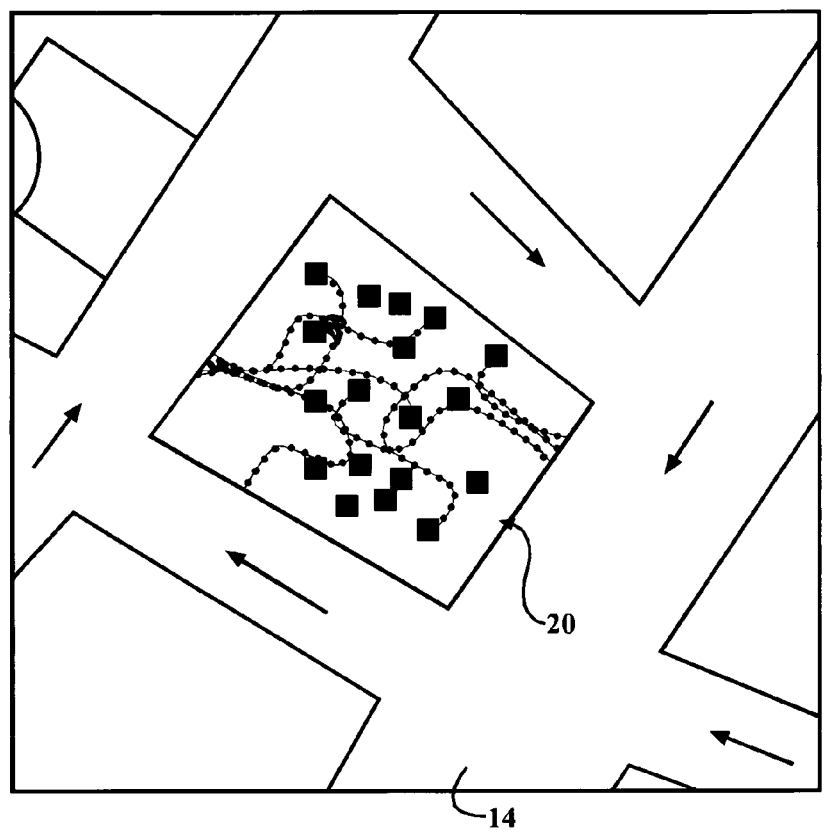
FIG. 9C is a view as in FIG. 9A showing probe trace data corresponding to the time during which the probe trace candidates are within the parking area.
Figure 9D:
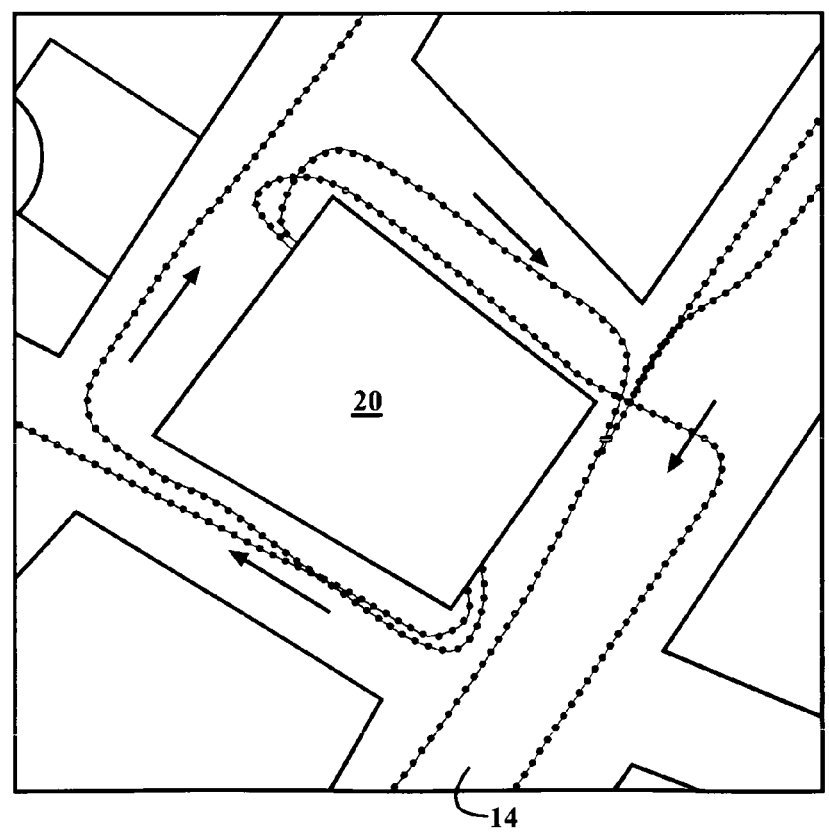
FIG. 9D is a view as in FIG. 9A showing only the probe trace candidates after exiting the parking lot.
Figure 9E:
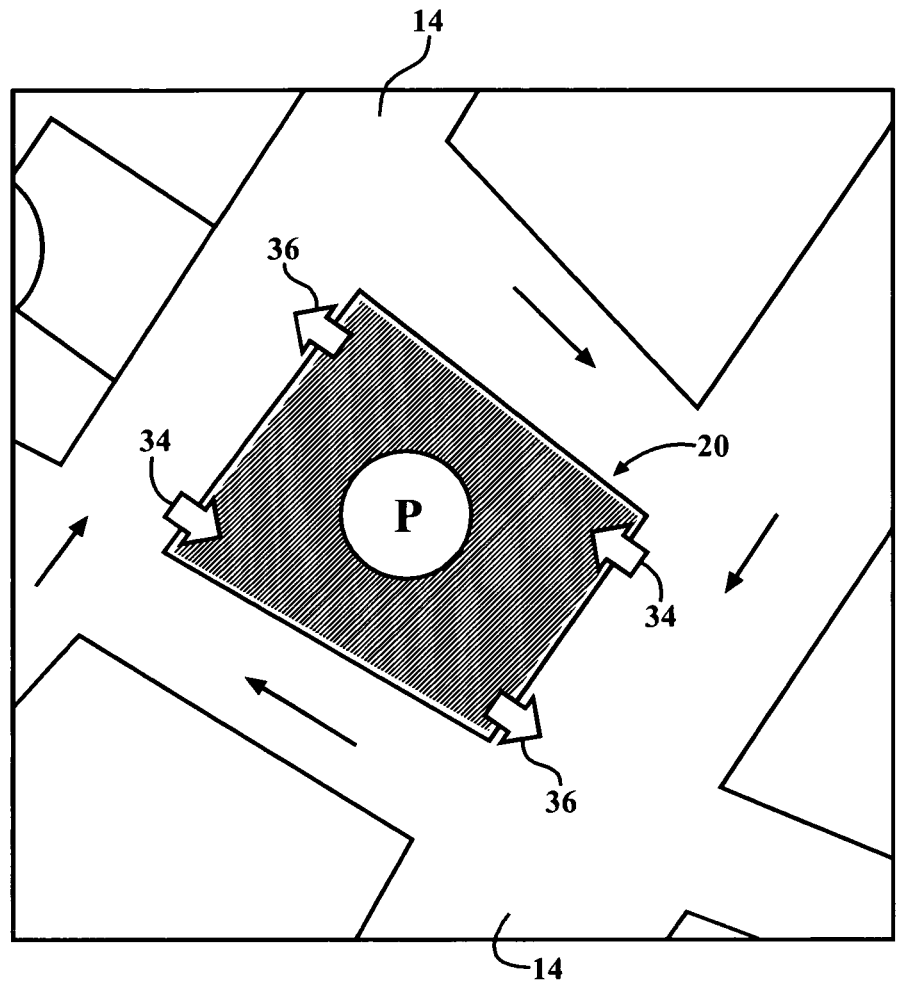
FIG. 9E is a view of the digital map referenced in FIGS. 9A-D, with the parking lot designated together with entrances to and exits from the parking lot relative to the surrounding road network.

After the adjustment of the parking lots 18, 20 into the road network 14, it is desirable to determine the connection to the roads of the network 14. For that purpose, the continuance of the traces can be used which are found in the parking lot 18, 20. The road network leading to and away from the parking lot 18, 20 can be generated using the same data as used in the parking lot detection steps described above. This is illustrated in FIG. 9A. Preferably, references to the traces 26 will be available from which each line was generated. If this is not the case, it may be necessary to use an additional map matching step in order to generate the missing references. Preferably, the connecting step includes identifying entrances 34 and exits 36 to and from the parking lot 18, 20. In order to distinguish between entrances 34 and exits 36, the candidate traces 26 are preferably divided into three parts: the part of the trace before the parking position (FIG. 9B), the part of the trace during the parking event (FIG. 9C), and the part of the trace after the parking position (FIG. 9D). Therefore, as shown in FIG. 9A, the part of the trace before the parking position 20 can be used to determine the entrances 34 to the parking lot 20. For each such trace part can be found the point where the trace leaves the road 14. Therefore, the trace references of the lines can be used. For the leaving points, a clustering method can be used to find out the different entrances 34. From the centers of the clusters, a network generation tool can be started in order to follow the traces. If the network generation process reaches the parking lot area, the process is broken. The point where the generated road reaches the parking lot 20 defines the connection point to the road network 14. However, in most cases, there is only a very short distance between the leaving point 36 and the parking lot 20. In this case, it is not necessary to start a network generation process. Rather, the nearest point of the parking lot area can be used to connect it to the road network 14. In the same manner, the exits 36 of the parking lot 20 can be determined. If an entrance 34 and an exit 36 of a parking lot 18, 20 are close together, it is possible to merge both. Although, it is usually only meaningful to merge entrance 34 and exit 36 if it is a bi-directional road map. FIG. 9E depicts an updated digital map 12 showing the entrance 34 and exit 36 points determined using the steps of this invention.

As mentioned previously, parking lots 18, 20 have different purposes, sizes and appeal to different consumer behaviors. Therefore, it is meaningful to classify the parking lots according to useful terms. One can use different patterns of the traces 26 which are parked there as well as the distribution of the position in order to assist in the classification process. For example, the following parking lot classes may be distinguishable from the probe trace data: multi-level parking structures, parking lots along a street, petrol stations, car wash stations, supermarkets, parking lots of companies, parking lots of hotels, airports, parking lots in residential areas, motorway parking areas, special parking lots for trucks, and many others. All of these different parking lot classes should be represented by different patterns which can be discerned through careful review of the probe data.

In addition to the classification of parking lot types, it may be beneficial to add further attributes to the detected parking lots, such as shown in FIG. 6. These additional attributes may be, for example, the size of the parking lot, the mean parking duration, main time of parking (day, night, morning, evening), number of cars per day, mean travel length of the cars, and the like. Further attributes may be included from external sources such as parking costs and the like. Some of these additional attributes allow classifying the parking lots much better than is available using current techniques. These attributes can be used as an additional criteria in the preceding step of connecting the parking lot 18, 20 to the road network 14.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A method for detecting parking lots from collected probe data for use in digital maps, said method comprising the steps of:

identifying probe trace candidates contained within a collection of probe data stored in at least one memory that correspond to at least one predetermined pattern indicative of parking lot behavior, wherein said probe data comprises a plurality of individual probe traces, each probe trace representing the movements of a vehicle over time on roads of a road network;

discerning at least one distinct parking lot from the probe trace candidates;

classifying said at least one distinct parking lot based on a pattern of probe data associated with said at least one distinct parking lot, wherein different parking lot classes are represented by different patterns;

updating a digital map database stored in the at least one memory containing data representative of the road network, wherein said updating comprises adding data representative of the at least one distinct parking lot and attributes of the at least one distinct parking lot to the digital map database; and providing said updated digital map database, or a geocoded image tile created using the updated digital map database, to a remote computing device for providing navigation assistance.

2. The method of claim 1, further including the step of connecting the at least one distinct parking lot to the road network.

3. The method of claim 2, wherein said connecting step includes dividing the probe trace candidates into segments relative to the at least one distinct parking lot.

4. The method of claim 2, wherein said connecting step includes identifying entrances to and exits from the at least one distinct parking lot relative to the road network.

5. The method of claim 1, further including determining a spatial extent of the at least one distinct parking lot directly from the probe trace candidates.

6. The method of claim 1, wherein said discerning step includes applying a clustering algorithm to the probe trace candidates.

7. The method of claim 6, wherein said stop-sequence-based pattern includes either a Simple Pattern technique wherein a set of consecutive positions with an approximate equal or identical spatial location, or an Accumulated Points technique wherein consecutive trace points that are close together are accumulated.

8. The method of claim 1, wherein said identifying step includes establishing a stop-sequence-based pattern.

9. The method of claim 1, wherein said identifying step includes establishing a Log-Event-based pattern.

10. The method of claim 9, further including the step of providing probe data, wherein said step of providing probe data includes recording the probe traces with a personal navigation device having ON and OFF power modes recorded with the trace data, and wherein said Log-Event-based pattern includes a Power-Cycle pattern influenced by the manipulation of the personal navigation device between its ON and OFF power modes.

11. The method of claim 9, further including the step of providing probe data, wherein said step of providing probe data includes recording the probe traces with a personal navigation device having at least two distinct navigation modes recorded with the trace data, and wherein said Log-Event-based pattern includes a GPS-fix pattern influenced by the manipulation of the personal navigation device between its at least two distinct navigation modes.

12. The method of claim 1, wherein said discerning step includes assigning a preliminary arbitrary rectangular shape, and then mathematically calculating an orientation and size of the rectangle, and then adjusting the shape of the at least one distinct parking lot relative to an adjacent road network.

13. The method of claim 1, further including computing additional attributes of the at least one distinct parking lot.

14. The method of claim 13, wherein additional attributes comprise at least one of: size of the parking lot, mean parking duration, main time of parking, number of cars per day, mean travel length of cars, and parking costs.

15. The method of claim 1, wherein the parking lot classes include at least one of: multi-level parking, surface lot type parking, parking lot along a street.

16. A non-transitory computer readable medium having computer software stored thereon comprising one or more software modules operable, when executed in an execution environment, to cause a processor to perform a method according to claim 1.

* * * * *